United States Patent
Bright et al.

(10) Patent No.: US 9,301,507 B2
(45) Date of Patent: Apr. 5, 2016

(54) METHOD, SYSTEM AND/OR APPARATUS FOR OPERATING A SELECTION SYSTEM

(75) Inventors: Kevin Phillip Bright, Hamilton (NZ); Jennifer Gwen Jago, Hamilton (NZ); Jacqueline Ellen McGowan, Hamilton (NZ)

(73) Assignee: LELY PATENT N.V., Maassluis (NL)

( * ) Notice: Subject to any disclaimer, the term of this patent is extended or adjusted under 35 U.S.C. 154(b) by 1120 days.

(21) Appl. No.: 12/443,927

(22) PCT Filed: Oct. 2, 2007

(86) PCT No.: PCT/NZ2007/000286
§ 371 (c)(1),
(2), (4) Date: Mar. 22, 2010

(87) PCT Pub. No.: WO2008/048112
PCT Pub. Date: Apr. 24, 2008

(65) Prior Publication Data
US 2010/0180824 A1    Jul. 22, 2010

(30) Foreign Application Priority Data

Oct. 2, 2006 (NZ) ......................... 549338

(51) Int. Cl.
| | | |
|---|---|---|
| A01J 5/00 | (2006.01) | |
| A01K 29/00 | (2006.01) | |
| A01K 1/00 | (2006.01) | |
| A01K 1/12 | (2006.01) | |

(Continued)

(52) U.S. Cl.
CPC ............... *A01K 29/00* (2013.01); *A01K 1/0023* (2013.01); *A01K 1/12* (2013.01); *A01K 5/02* (2013.01); *A01K 11/006* (2013.01)

(58) Field of Classification Search
CPC ...................................................... A01K 29/00
USPC .......................... 119/840–843, 14.08, 14.02
See application file for complete search history.

(56) References Cited

U.S. PATENT DOCUMENTS

| | | | | |
|---|---|---|---|---|
| 4,798,175 A | * | 1/1989 | Townsend et al. ......... | 340/572.7 |
| 5,653,192 A | * | 8/1997 | Sheen et al. ............... | 119/51.02 |

(Continued)

FOREIGN PATENT DOCUMENTS

| | | |
|---|---|---|
| GB | 2 232 053 A | 12/1990 |
| NZ | 512521 | 6/2001 |

(Continued)

OTHER PUBLICATIONS

Trevarthen, A., "The Importance of Utilizing Electronic Identification for Total Farm Management: A Case Study of Dairy Farms on the South Coast of NSW", 2005, pp. 1-168. http://ro.uow.edu.au/cgi/viewcontent.cgi?article=1000&context=thesesinfo pp. 1-168.

*Primary Examiner* — Kristen C Hayes
(74) *Attorney, Agent, or Firm* — Greer, Burns & Crain, Ltd.

(57) ABSTRACT

Computer executable instructions adapted to control an animal's access to a channel leading to a remote resource, the instructions being adapted to execute steps of: retrieving a specific animal record based on the output of an identification component, and issuing a control signal to an animal selection system to allow an animal access to the remote resource if the retrieved animal selection record indicates priority animal status, and that an existing number of animals present in the channel is below a queue threshold value.

14 Claims, 6 Drawing Sheets

(51) Int. Cl.
  *A01K 5/02*   (2006.01)
  *A01K 11/00*  (2006.01)

(56) References Cited

U.S. PATENT DOCUMENTS

| | | | |
|---|---|---|---|
| 6,062,164 A * | 5/2000 | Oosterling | 119/14.02 |
| 6,516,746 B2 | 2/2003 | Pratt | |
| 6,526,919 B1 * | 3/2003 | Schick | 119/840 |
| 7,874,263 B2 * | 1/2011 | Schulte | 119/14.02 |
| 8,567,344 B2 * | 10/2013 | Van Der Tol et al. | 119/14.02 |
| 2011/0232576 A1 * | 9/2011 | Van Der Tol et al. | 119/14.02 |

FOREIGN PATENT DOCUMENTS

| | | |
|---|---|---|
| WO | WO 00/01226 | 1/2000 |
| WO | WO 01/93666 | 12/2001 |
| WO | WO 03/000044 A1 | 1/2003 |
| WO | WO 2006/059916 A2 | 6/2006 |

* cited by examiner

METHOD, SYSTEM AND/OR APPARATUS FOR OPERATING A SELECTION SYSTEM

TECHNICAL FIELD

This invention relates to a method, system and/or apparatus for operating a selection system. Preferably the present invention may be used in conjunction with a selection system to determine whether an animal is ready to join a queue of animals awaiting service by a remote resource. In a preferred embodiment a remote resource may be an automatic milking system (AMS) which milks an animal. However, those skilled in the art should appreciate that other applications for the method of operating a selection system may also be considered, and reference to its use in the above application only throughout this specification should in no way be seen as limiting.

BACKGROUND ART

Milking systems, which automatically milk dairy animals, are known in the field of farming and commonly referred to as automatic milking systems (AMS). The most common dairy animal with which an AMS may be used is a cow. Most AMS can be used with small herds of cows which are housed in barns. The animals live and are fed in a large barn which also houses the automatic milking system. The animals can wander from the end of the barn to the automatic milking system, where the cow is fed and milked at the same time.

This system, however, does not work effectively in situations in which cows are not housed in barns, but are housed in paddocks, where they freely graze from pasture. These animals are usually milked twice a day, using conventional milking systems. The animals can walk considerable distances (sometimes up to 2-3 kilometers) from their grazing paddocks to the milking area. The paddocks in which the animals graze may change regularly to maintain a good feed level and allow the grass and vegetation in each paddock to recover from grazing and to most effectively utilise the feed that is grown.

Using an AMS with this kind of pasture based farming can be difficult. The animals (usually cows) must rotate which paddocks they graze in, allowing optimum growth of the grass and health of the animals. Implementing an automatic milking system, which will work whichever paddock a cow is in, and includes a long walk to the building housing the AMS, can be difficult.

One way of overcoming this problem is described in New Zealand Patent No. 512521, which discloses a selection system and method for milking animals. This system works by having an attractant at a selection station in a grazing paddock. As the cows are drawn to the attractant, the system identifies each cow using a tag reader. This identification information is then checked against milking records. If a cow meets a predetermined criterion it is then allowed access to a passage or raceway which leads to the milking area, which may include an automatic milking system. If the cow does not meet the predetermined criterion, the cow is directed back to the old or onto a new paddock.

The attractant is usually something that the animal would like to feed from once or twice a day, such as water, feed, or grain. The basic selection system makes a decision based on information from milking records to determine whether the cow should be milked and allows the cow into a race to walk to the automated milking system. This simple predetermined criteria of whether a cow should be milked based on milking records can be limiting, as it does not take into account the animals health, the number of animals in the race or any other discriminating factors such as individual behaviour patterns.

The nature of the attractants available in or via the selection system, as well as the diurnal patterns of cows means that many cows may enter the system at the same time or in close succession. This can create a long queue, in which an animal is required to stand for a long time as it waits to be milked. Long wait times create stress on animals, and result in inefficient use of the system. This can impact on the quality and volume of milk, or the health of the animal.

Long periods of time off pasture waiting to be milked is also a less positive experience for the cow thereby reducing her likelihood of returning to the selection system for further selection for milking, in turn making the complete system less effective. It would be preferable for the animal to remain in the paddock and be able to graze or lie comfortably, rather than stand or lie in a long queue.

It would also be preferable if there was a way of ensuring priority animals were sent to the AMS for milking. Animals might be designated as a priority due to health reasons, such as temperament or other behaviour reasons, lactation condition or physiological state such as mastitis, lameness or reproductive status.

Similar problems to the above discussed with respect to automatic milking systems are also present in relation to pasture management for livestock. Grazing animals need to be shifted from one break of pasture to another over time as the original pasture is depleted. Generally, animals have to travel some distance through a channel or race to the new pasture. It would therefore be of advantage to have a selection system which could preferentially allow some animals priority access to new pasture over other animals. It would also be of advantage to have a selection system which could consider characteristics of animals when determining which animals should be allowed access to sources of new pasture.

An improved system for selection of which animals are enqueued would be preferred. Specifically, one that takes into account the amount of animals already in the queue, and the likelihood of an animal returning to the attractant at a later time. This would allow the minimal queue to be kept at all times, and animals that are seen to be returning often can be turned away, whereas animals which return only once a day can be enqueued as a priority.

A system which also takes into account whether the animal would be milked by the automatic milking system would also be an advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

DISCLOSURE OF INVENTION

According to one aspect of the present invention there is provided a method of operating a selection system, said selection system being adapted to control an animal's access to a channel leading to a remote resource, said method being characterized by the steps of;
  i) identifying an animal, and
  ii) allowing the identified animal access to the channel if said animal is identified as a priority animal.

According to another aspect of the present invention there is provided a method of operating a selection system, further characterised by the additional subsequent step of allowing the identified animal access to the channel if the animal is determined able to use said remote resource.

According to a further aspect of the present invention there is provided a method of operating a selection system, further characterised by the additional subsequent step of allowing the identified animal access to the channel if the existing number of animals present in the channel is below a queue threshold value.

According to another aspect of the present invention there is provided a method for operating a selection system, further characterised by the subsequent step of allowing the identified animal access to the channel if the animal's return rate is below a return rate threshold.

According to a further aspect of the present invention there is provided a method of operating a selection system, further characterised by the additional subsequent step of assessing the current value of a remote resource against a threshold value to determine if an identified animal should be allowed access to said remote resource.

According to yet another aspect of the present invention there is provided a method of operating a selection system further characterised by the additional subsequent step of assessing the current value of a resource presently available to an animal against a threshold minimum value for said resource to determine if the identified animal should be allowed access to a remote resource.

According to yet another aspect of the present invention there is provided an information management system for a selection station, said information management system including
  an identification means, and
  a data storage means configured to store animal selection records, and
  a processing means, and
  a control system configured to operate a selection station,
  wherein the processing means is adapted to process animal selection records stored by the data storage means to determine whether the control means should issue a control signal to operate a selection station.

According to a further aspect of the present invention there is provided a set of computer executable instructions stored on a computer readable medium, said instructions also being adapted to execute steps of;
  i) retrieving a specific animal record based on the output of an identification means, and
  ii) issuing a control signal to allow an animal access to the remote resource if the retrieved animal selection record indicates priority animal status.

According to a further aspect of the present invention there is provided a set of computer executable instructions, said instructions being adapted to execute the additional subsequent step of issuing a control signal if the retrieved animal selection record indicates that the animal associated with the record is able to use the remote resource.

According to a further aspect of the present invention there is provided a set of computer executable instructions, said instructions being adapted to execute the additional subsequent step of issuing a control signal if the retrieved animal selection record indicates that an existing number of animals present in the channel is below a queue threshold value.

According to further aspect of the present invention there is provided a set of computer executable instructions, said instructions being adapted to execute the additional subsequent step of issuing a control signal if the retrieved animal selection record indicates that the return rate of the animal associated with the record is below a return rate threshold.

According to a further aspect of the present invention there is provided a set of computer executable instructions further characterised by executing the additional subsequent step of assessing the current value of a remote resource against a threshold value to determine if an identified animal should be allowed access to said remote resource.

According to a further aspect of the present invention there is provided a set of computer executable instructions further characterised by executing the additional subsequent step of assessing the current value of a resource presently available to an animal against a threshold minimum value for said resource to determine if the identified animal should be allowed access to a remote resource.

The present invention may provide a method of operating a selection system. The selection system may be adapted to control an animal's access to a channel leading to a remote resource.

A resource may preferably be an automatic milking system (AMS), which allows animals to be milked by a machine without human intervention. However, in alternative embodiments this resource may be a feed station, a station where animals are screened for health problems, or any other kind of area in which animals need to be moved into to receive some form of service from a resource.

For example, in one alternative embodiment the present invention may be employed to control access to blocks or breaks of pasture on a per animal basis. In such embodiments the particular characteristics of individual animals may be assessed in decision making logic employed by a selection system to determine whether an animal presenting to a selection station be immediately allowed to access new pasture.

Reference throughout this specification will be made to a resource being an automatic milking system. However, those skilled in the art should appreciate that other resources may also be used, and reference to the resource being an automatic milking system only throughout this specification should in no way be seen as limiting.

Preferably an animal may be a livestock animal, which is housed remotely from the automated milking system. These animals may preferably be cows, which may graze in a pasture a distance from the automated milking system. Alternatively, animals may be sheep, goats, or any other type of dairy animals which the system is configured to milk which are kept in an area remote from the system.

Reference throughout this specification will be made to an animal being a cow.

However, those skilled in the art should appreciate that other animals may also use the present invention, and reference to its use with cows only throughout the specification should in no way be seen as limiting.

Preferably a channel leading to a remote resource may be provided by a race or fenced in area or path leading from the pasture in which the animal is housed, to the automated milking system. This race may be varied in length and/or configuration, based on which pasture or paddock the animal is housed in.

The present invention may provide a method of operating a selection system, which may either enable or disable access to the race or fenced area. This selection is based on selected criteria of each animal attempting to access said race. This allows a user to prioritise each animal's access to the channel and therefore the animal's access to the remote resource. It allows the selection system to help maintain an optimal number of animals in the race leading to the milking system, therefore optimising the throughput efficiency of said system.

Preferably, the present invention may provide a method, system or an apparatus for operating a selection system. An information management apparatus may be used to manage the operation of the selection station.

An information management system may be formed by a computer system associated with the selection station, which processes data and allows the selection station to select an animal based on this data process. Preferably an information apparatus may consist of an identification means, a data storage means, a processing means, and a control system.

Preferably an identification means may be a system which works in conjunction with an identification element connected to an animal to identify the animal. However in alternative embodiments, an identification means may be provided by any other means for identifying an animal moving through the information management apparatus.

Preferably an animal may be identified by the system reading an identification element connected to the animal. This identification element may consist of an RFID tag which the animal wears, and a corresponding tag reader which then identifies the animal. An ear tag containing an RFID component is commonly used on livestock animals. This tag can identify an animal as the animal passes a tag reader. This identification element can then be used to query a storage means associated with further information on the identified animal. However, in alternative embodiments the animal may be identified through other means, such as other identification tags, infrared tags, or any other means which identifies an animal to the system.

Reference throughout this specification will be made to an identification means being an RFID tag reader. However, those skilled in the art should appreciate that other identification systems may also be used, such as infrared tags, and reference to the identification means being an RFID tag reader only throughout this specification should in no way be seen as limiting.

Preferably a data storage means may be part of a computer's memory (either dynamic or static). Preferably the data storage means stores a number of animal selection records. The system may store the records in a number of ways, allowing a selection system to access the records.

Preferably an animal selection record may consist of information describing an animal. The information is preferably stored in a data storage means, and consists of an identifying portion-identifying the animal, and a number of variables, which relate to this animal, a group of animals, or the overall system. These variables may be used by the information management system to process the animal selection records to determine whether an animal should have access to a channel leading to a remote resource.

Preferably the information management system may include a processing means. Preferably this processing means may process the animal selection records to determine whether the control means should issue a control signal to the selection station. In some embodiments a processing means may be formed by a microprocessor. The processing of the animal selection records may include retrieving data from these records, and comparing them to predetermined thresholds or identification numbers to determine whether the control means should issue a control signal to the selection station.

For example, if an identification means identifies an animal, and the processing means matches this identification to a record in the animal selection records which corresponds to a priority animal, then the control system may select an animal. The processing means may preferably be provided by a computer based program which reads the animal selection records as data and then processes these.

Preferably the computer executable instructions may retrieve a specific animal record based on the output of an identification means. This is preferably executed by when an identification means identifies an animal, the program will then match this identifier to a specific animal record. This animal record may then be processed using the processing means, to treat information from this record based on further steps of the program.

Preferably a set of computer executable instructions may form a part of a computer program which is processed by the processing means.

Preferably a method of operating a selection station may be executed by computer executable instructions, but in alternative embodiments other means for executing the method may be considered. Preferably the processing means may be a microprocessor programmed with a set of computer executable instructions.

These instructions may direct the information management system to operate a selection system in accordance with a preferred embodiment of the present invention.

Reference throughout this specification will be made to a processing means being a microprocessor programmed with computer executable instructions. However, those skilled in the art should appreciate that other processing means may also be used, and reference to the above only throughout this specification should in no way be seen as limiting.

Preferably a control system may operate with the selection system. Preferably a control system may provide a control signal to a selection station, allowing that selection station to enable or disable access to a race. The control system would preferably receive information from a processing means, then may issue a control signal to the selection station. The processing means may indicate to the control system that the animal identified should be allowed access to a race, thus the control system will issue a signal allowing a selection station to allow access to the said animal. This signal may be a certain voltage output, indicating a true or false condition, or it may be any other way of providing a signal to a selection station.

Preferably, an animal may be allowed access to a channel if it is determined a priority animal by the information management system. Preferably the animal may be manually labelled as priority by the user. A user may wish to designate an animal as being a priority based on data not maintained by the selection system, such as temperament, health of the animal, or the animal's weight. This may allow a user to manually override the system when desired. For example, in some embodiments a user may wish to flag a particular animal for diversion due to health reasons. They may therefore assign priority status to this animal to ensure that the animal is draughted to the remote resource as soon as it presents to the selection system.

However, in some embodiments at least one automated process may be completed to assign priority status to a particular animal.

For example, in one embodiment an animal may be accorded priority status if the animal has not been milked for a time period exceeding a maximum milking interval. This milking interval can be employed to ensure that all animals are milking regularly and that an animal which has not approached the selection station for some time will immediately be classified as a priority animal and directed towards the remote milking system.

In yet other embodiments different automated processes may be completed to assign priority status when the type of remote resource varies. For example, in one alternative embodiment where the remote resource to be accessed is a new break pasture, priority status may be assigned to a particular animal if that animal is classified as a high productivity animal. In the case of dairy applications, cows which have a high than average yield may be given preferential access to new pasture through the assignment of priority status.

Preferably the animal may be allowed access to the race if it is determined able to use the automatic milking system. This determination may be based on the status of at least one parameter belonging to the identified animal. For example, this parameter may indicate whether this animal is carrying above a certain amount of milk. Other parameters may also be used to determine whether the animal is able to use the system, such as the weight of the animal, the health of the animal, or any other predetermined criteria.

For example, in one preferred embodiment a determination may be made as to the predicted or potential yield of milk currently carried by an animal based on a known or estimated milk secretion rate for that particular animal. A user or users of the present invention may therefore set a minimum yield value as an indicator regarding whether an animal can use the automatic milking system, with the predicted yield parameter being compared with same to make a decision as to whether the animal should be allowed access to the channel.

In yet other embodiments predicted or potential milk yield may be employed in a selection system decision when resources other than remote milking systems are involved. For example, in one alternative embodiment where the remote resource to be accessed is new pasture, current predicted yield may be used to determine whether a cow should be held back from the new pasture. Cows given access to new pasture generally prefer to stay and graze for as long as possible and therefore can delay the completion of a milking cycle. Current predicted milk yield can be used to hold back cows from new pasture which should be milked in the short term.

In such embodiments a further test may be completed with respect to the value or quantity of pasture remaining in an existing or old paddock and/or the value of quantity of pasture present in a new paddock which an animal may potentially be given access to. If a cow is held back from new pasture on the basis of current predicted milk yield, this cow may still be allowed through to the new pasture if the old pasture break is significantly depleted, or the new pasture break has already been depleted by cows already allowed access to same.

Preferably an animal may be allowed access to the race if the number of animals present in the channel or race is less than or equal to a queue threshold value. If the channel queue length is above a certain threshold value, then the selection system may prevent a further animal accessing the race.

In a further preferred embodiment the present invention may employ two separate and distinct queue threshold values, being a maximum queue threshold value, and a marginal queue threshold value. In such embodiments the maximum queue threshold value may function in the same way as that described above, preventing further animals accessing the channel, or preventing non-priority status animals accessing the channel. The marginal queue threshold value may define a range of queue length values in which a further assessment may be made of data parameters associated with an animal to determine whether it should be allowed to access to the queue.

For example, in instances where the marginal queue threshold is five animals less than the maximum queue threshold, once the marginal queue threshold is reached, the system may prevent animals which are not priority animals from entering, and only allow infrequent visitors into the queue. This may avoid long queues building up, thus creating stress on the animals. It also may allow an optimum amount of animals in the queue at all times, thus increasing the efficiency of the remote resource, and the selection system.

This threshold value or values may be variable, based on the length of the channel leading to the remote resource. If the race is longer, the queue threshold value may be higher, allowing more animals into the queue. However, if the race is small and the animals only have a short distance to travel to the milking system, then the queue threshold value may be lower. A queue threshold value may also change depending on a number of variables, such as weather, condition of the animals, time of year, and so forth.

When the number of animals in the queue is below a threshold value, if the identified animal is able to access the resource based on previous selection criteria, then the animal will be allowed access to the queue. However, if the queue threshold value is exceeded, then the animal may not necessarily be allowed access to the queue.

The return behaviour of an animal may describe the number of times an animal returns to the selection station during a set period of time. If the animal returns only once a day, then it may have a low return rate. However if the animal returns many times during the day, then its return rate may be classified as high. The animals return rate and behaviour may also describe the average time that it takes for an animal to return to the selection station.

The selection station may allow access to the race if the animals return behaviour is below a return threshold rate. This return threshold may be set based on the length of the queue, a queue threshold, or any other variable. If an animal has a return rate below the return threshold rate, the animal may be allowed access to the channel. If however, the queue is above a certain length, or other variables are exceeded, and the animal is known to return to the selection station every two hours, the animal may be turned away as this animal is likely to return at a later time when the channel is not as busy.

For example, in some embodiments when the length of the queue sits between a marginal and maximum threshold value, the return rate of an animal presenting at a selection station may be compared against a threshold return rate. Animals with a low return rate may therefore be allowed access to the channel, whereas animals which return frequently to the selection station may be refused access.

The return threshold rate may be set based on a number of variables, and there may also be taken into account whether this is the animal's first or subsequent return to the selection station during one period of time. The period of time may be a day, or half a day, or some other period, depending on how often the animals are to be milked.

An animal's return pattern may vary over time as an animal's visiting pattern can vary based on weather conditions, lactation condition or the length of the race to the milking system. The selection system may collect return rate data for a herd of animals, allowing the return rate threshold to also vary based on this information.

In a preferred embodiment the present invention may also be employed to increment a return rate parameter included within an identified animal record after the animal's record has been retrieved. Those skilled in the art should appreciate that computer executable instructions working in conjunction with an associated information management system may be employed to update a return rate parameter once an animal presents itself to gain access to the remote resource.

In a further preferred embodiment, the present invention may also be employed to assess whether an animal should be allowed access to a second resource after having being refused access to a first or primary remote resource. For example, in some embodiments an animal entering a selection station may initially be assessed with respect to gaining access to a remote automated milking system. If access to the milking system is refused the same animal may again be assessed to determine whether the animal should be given access to a new pasture break. A similar set of criteria to that discussed above may be employed to determine an animal's worthiness for access to a second resource.

In a further preferred embodiment an animal may be allowed access to a second resource if that animal has been allocated priority animal status. In the case where the second resource is provided by new pasture, animals with higher than average productivity may be allocated priority status and given access to new pasture earlier than animals with lower productivity. In such embodiments the lower productivity animals may in turn be allowed access to new pasture if a predicted milk yield associated with the animal is below a threshold which indicates the animal can use an associated remote automated milking system. In such instances animals carrying a minimal amount of milk will be allowed to graze on new pasture for extended periods of time.

In yet other embodiments a decision to allow access to a secondary resource consisting of new pasture may be made through an assessment of the value or quantity of the new pasture currently available or the value or quantity of old pasture which an animal originated from. If the old pasture is effectively grazed out, access may be given to new pasture. Conversely, if animals already allowed access to new pasture have substantially depleted same, more animals may be allowed access to this pasture immediately.

The present invention provides an improved way of selecting animals to be allowed access to a race leading to a milking system. This improved system takes the identification of an animal, determines the variables of this animal to a range of predetermined criteria to determine whether the animal is able to enter a race leading to a milking system.

This selection system provides an improved way of enqueuing the animals, which allows the system to maintain a minimal queue at all times. This minimal queue results in less stress on the animal and improved efficiency of the queuing systems. If the animals are in a minimal queue at all times, the automatic milking system can be utilised constantly, resulting in increased efficiency of the system.

Smaller queues also allow animals to relax as they are free to roam in a pasture before entering the race, and if the race contains an increasingly long queue, they may be free to roam longer and are in cramped conditions for less time.

The present invention may provide a number of advantages over the prior art.

The selection system may allow an optimum queue length to be maintained at all times. It may allow a user to prioritise an animal's use of a milking system, and creates less stress on an animal to be milked.

The selection system can also decrease the likelihood of an animal reaching the milking station, and then being rejected for milking based on the fact that they may not have enough milk, they may have returned recently, or they may be unhealthy. The selection system allows these factors to be considered before the milking station is reached, and therefore an unsuitable animal may be turned away at an earlier stage, thus reducing inefficiency in the system.

The selection system may provide an efficient system for enqueuing animals to be milked by an automatic milking system.

The present invention may also be employed in pasture management applications. The present invention may assess parameters or characteristics associated with particular animals to assess whether access should be given to a new pasture break. In some instances the present invention may be employed to manage pasture in isolation, or in other embodiments, may initially assess an animal with respect to access to an automated milking system, and if access is not granted the animal may be assessed with respect to access to a new pasture break.

BRIEF DESCRIPTION OF DRAWINGS

Further aspects of the present invention will become apparent from the following description which is given by way of example only and with reference to the accompanying drawings in which.

BEST MODES FOR CARRYING OUT THE INVENTION

Figure 1:
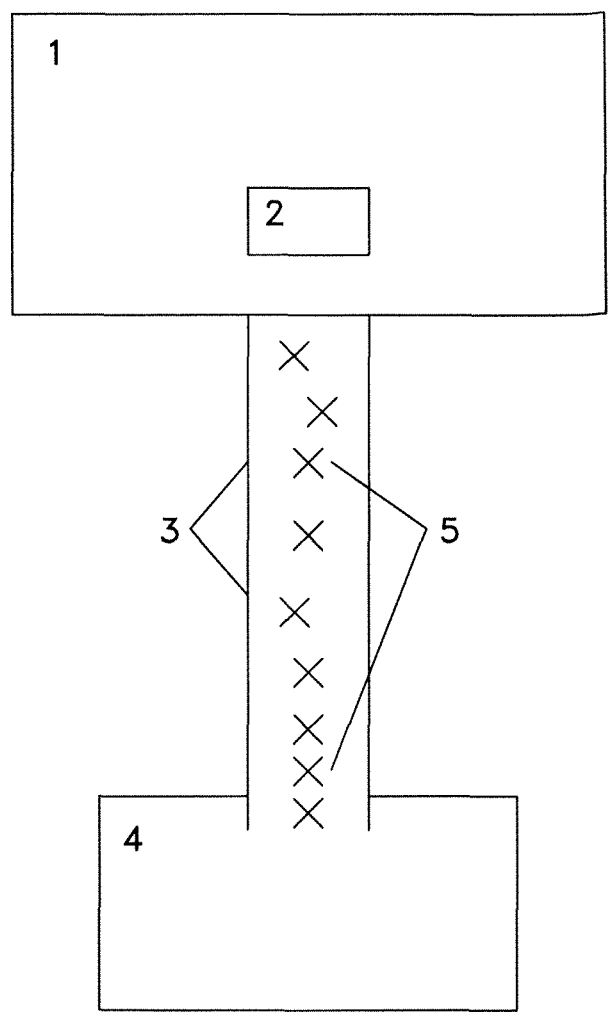
FIG. 1 shows a plan view of a prior art selection system.

FIG. 1 shows a plan view of a selection system as seen previously with respect to NZ 512521.

This view shows a holding paddock (1), including a selection station (2), which controls access to a channel configured as a race. This race (3), leads to a remote resource, which in this case is a milking system (4). The animals to be milked (5) are in a queue leading to the milking system (4).

This system provides no control of the queue length, and therefore there is the potential to form long queues, as is shown.

Figure 2:
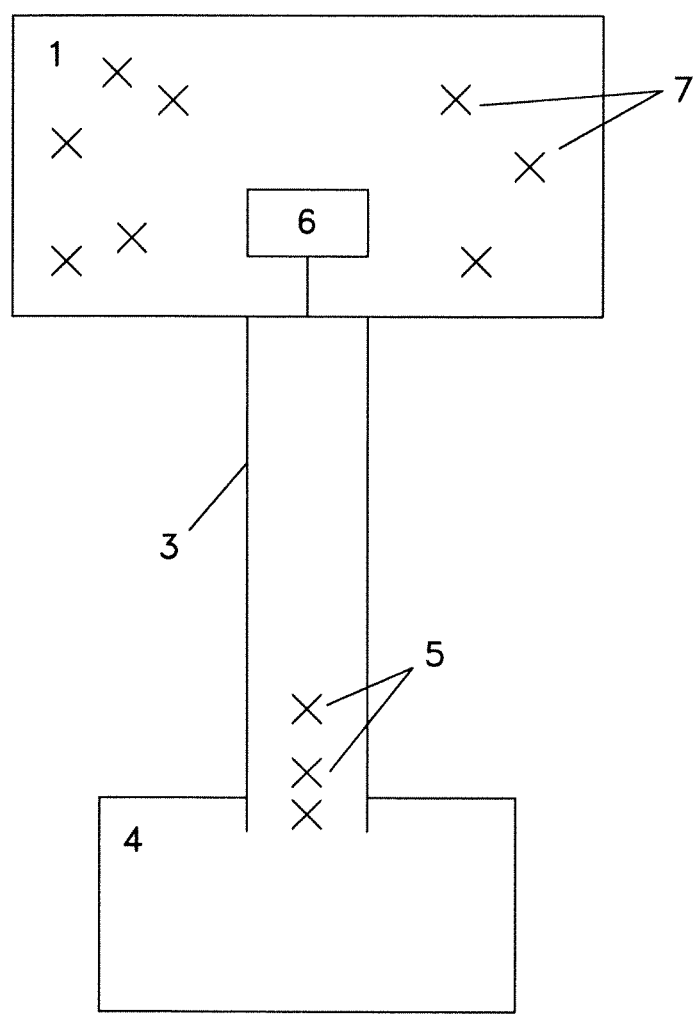
FIG. 2 shows a plan view of a selection station system configured in accordance with the present invention.

FIG. 2 shows a plan view of a selection station system configured in accordance with the present invention.

This view shows a holding paddock (1) with an improved selection system (6) leading to a channel (3) leading to a milking system (4). The cows to be milked (5) are waiting in a short queue before entering the milking system area, and other cows (7) are waiting in the holding paddock (1) where they are free to roam, graze, and are not stressed by being in a long queue.

The present invention provides an improved way of selecting the cows to be enqueued (5), so that a queue is maintained at an optimum length, and further cows to be milked later (7), may roam freely in a holding paddock (1), therefore creating less stress on the animals.

Figure 3:
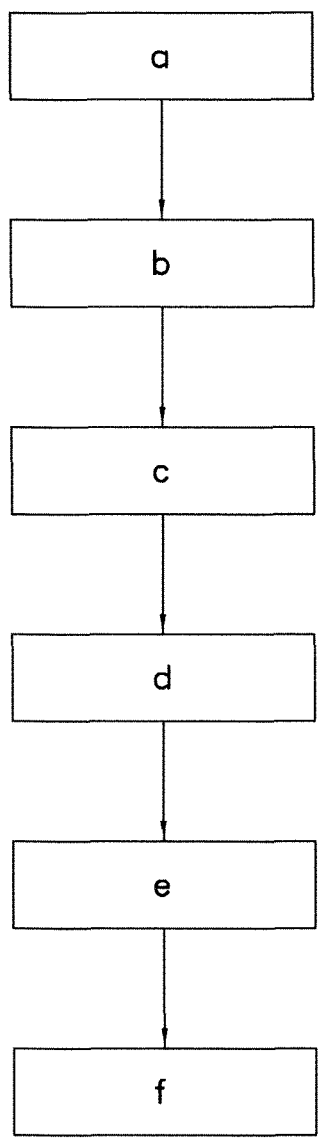
FIG. 3 shows a flow chart of the basic steps, executed in accordance with a preferred embodiment of the present invention.

FIG. 3 shows an illustration of the basic steps executed by the present invention in one preferred embodiment.

Step a: An animal is identified by an identification means, or tag reader.

Step b: The selection station allows this animal access to the race if the information management system determines that the animal is a priority animal.

Step c: The system may also allow the non-priority cow access to the race if the system determines that the cow would be milked by the milking system. This allows animals that have already been milked that day to be turned away.

Step d: The system may then determine how long the queue is, and if the queue is longer than a certain threshold it may turn the animal away. If the queue is lower than this threshold, it may allow the animal access to the raceway to the milking system.

Step e: The system may then determine how often an animal usually returns to the selection station. If this return rate is low, the selection station may allow the cow to access the race.

Step f: The system may then determine whether an animal fits other priority criteria due to health reasons, such as temperament or other behavioural reasons, lactation condition or physiological state such as mastitis, lameness or reproductive status.

The present invention provides an improved method for determining whether an animal should be allowed access to a race which leads to a milking system. It may of course be used with a variety of remote resources, providing access and a steady flow of animals to this resource.

The present invention allows a system to operate efficiently, for animals to remain as relaxed as possible. The present invention may work with a milking system to provide an optimum system for using milking systems in farms, where animals are housed a distance from this milking system.

Figure 4A:
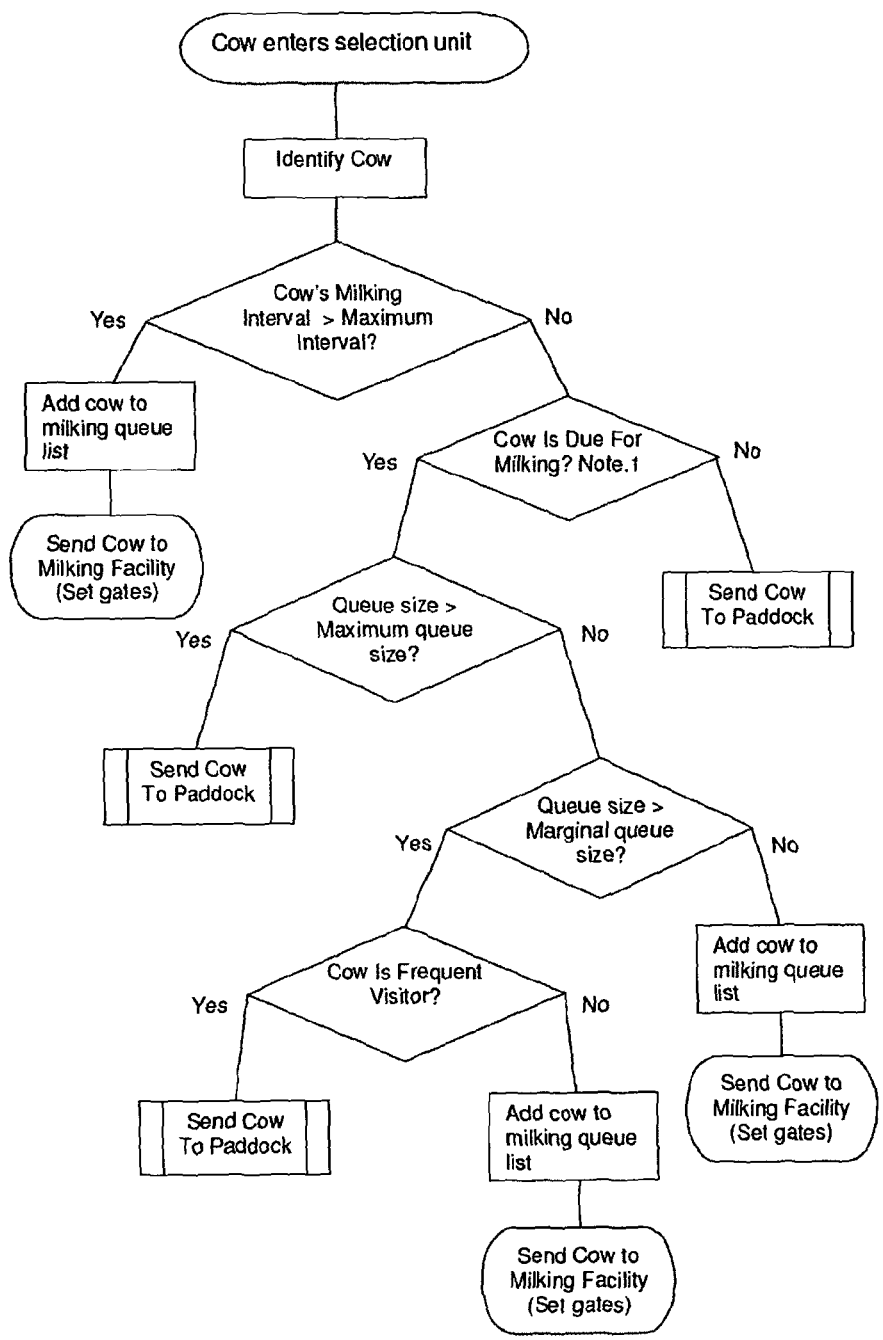
FIGS. 4a, 4b show flowcharts illustrating the steps executed in accordance with a further embodiment to select a cow for access to a milking system and/or access to new pasture.
Figure 4B:
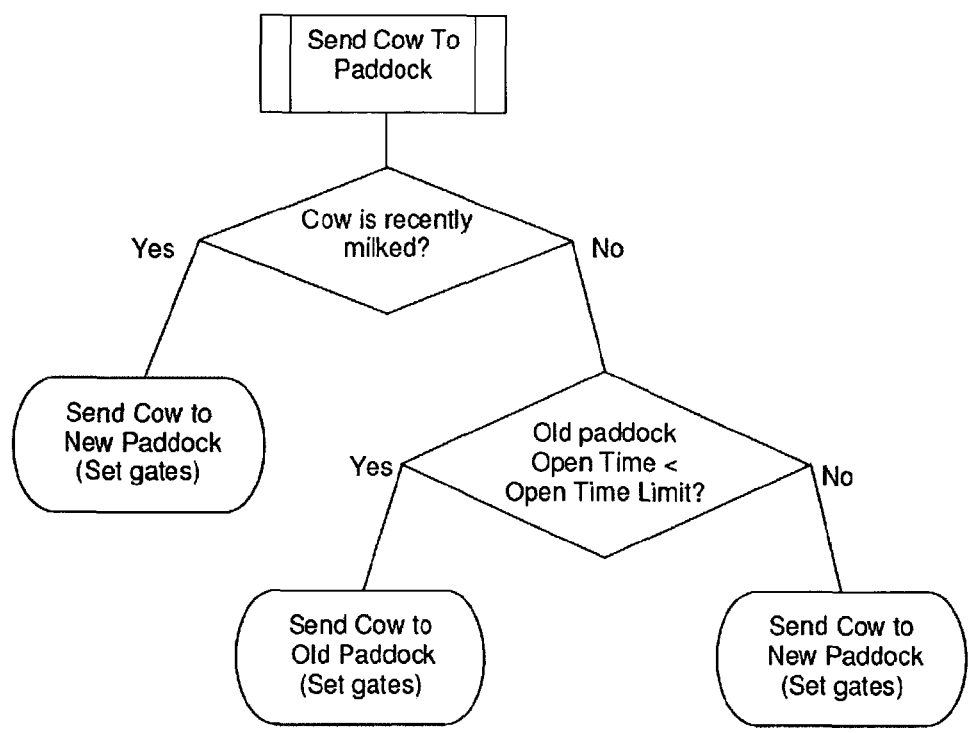

FIGS. 4a and 4b show flowcharts illustrating the steps executed in accordance with a further embodiment to select a cow for access to a milking system or access to new pasture.

Once a cow is initially identified, an assessment is made as to whether the cow has priority status through determining whether she is flagged for health reasons or has a milking interval which exceeds the maximum milking interval defined for all members of the herd.

If the cow is not a priority status animal, an assessment is next made of whether the cow is due for milking through comparing a predicted yield value associated with the cow at the present point in time, with a threshold milking yield value assigned to all members of the herd. This predicted yield value is used to determine if the cow can use the remote milking system. If the cow is determined able to use the remote milking system, the current length of the queue giving access to the milking system is compared with a maximum queue size and marginal queue size. A cow will be sent back to a paddock if the maximum queue size has been exceeded, or if the marginal queue size has been exceeded and the return rate of the cow is higher than a threshold return rate.

Pseudo code illustrating an instruction set employed to implement the above process is set out below:

```
Identify cow
IF Cow's milking interval > maximum interval OR cow is flagged
for health treatment THEN
    Add cow to milking queue list
    Set gates to send cow to milking facility
ELSE
    IF Cow is due for milking THEN
        IF queue size > maximum queue size THEN
            CALL Send cow to paddock (thisCow)
        ELSE
            IF queue size < marginal queue size THEN
                Add cow to milking queue list
                Set gates to send cow to milking facility
            ELSE
                IF cow is frequent visitor THEN
                    CALL Send cow to paddock (thisCow)
                ELSE
                    Add cow to milking queue list
                    Set gates to send cow to milking facility
                ENDIF
            ENDIF
        ENDIF
    ELSE
        CALL Send cow to paddock (thisCow)
    ENDIF
ENDIF
Function "Send cow to paddock (thisCow)"
BEGIN
    IF Cow is recently milked THEN
        Send cow to new paddock
    ELSE
        IF old paddock open time < open time limit THEN
            Send cow to old paddock
        ELSE
            Send cow to new paddock
        ENDIF
    ENDIF
RETURN
```

As can be seen above; the Function "Send cow to paddock (thisCow)" is also defined. The execution of this function is also illustrated in the flowchart of FIG. 4b. This function is called when a cow is initially refused access to a milking system or facility as illustrated by FIG. 4a. This function determines if a cow should be allowed access to a second resource such as a paddock with new pasture.

In this function, the priority status of the animal is first investigated through determining the cow's milking interval and whether she has been milked recently.

A recently milked cow will be sent to a new paddock. If the cow has not been milked recently, an assessment is made as to how long the old paddock has been grazed to determine the value or capacity of the remaining pasture resource provided by the old paddock. If the pasture in the old paddock has been significantly depleted through an assessment of opening times a cow will be allowed access to the new paddock.

Figure 5:
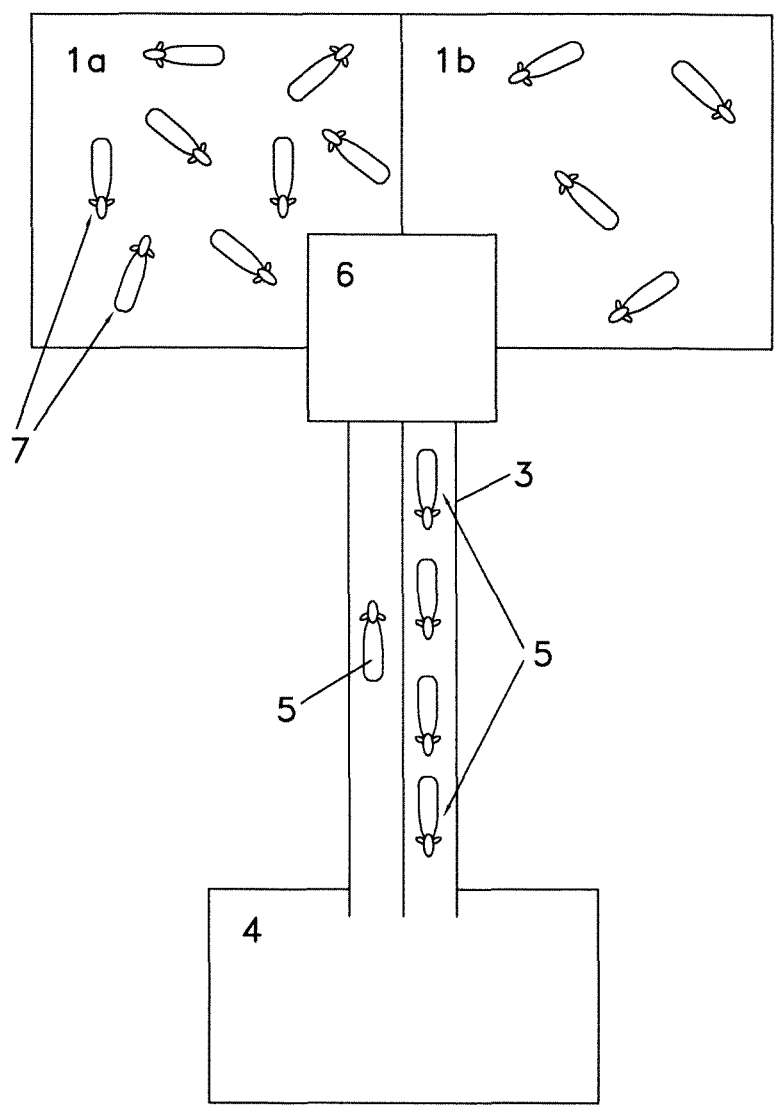
FIG. 5 shows a plan view of a selection station and associated paddocks provided in accordance with a further embodiment of the present invention.

FIG. 5 shows a plan view of a selection station and associated paddocks provided in accordance with a further embodiment of the present invention.

In the embodiment illustrated a selection station (6) provides access to a remote milking system (4) by way of a channel or race (3). Animals (5) in an existing or old paddock (1a) gain access to the milking system (4) through the selection system (2) becoming an enqueued animal (5).

After milking occurs the animal then returns to the same selection station (2) by way of a return race (3).

As discussed with respect to FIGS. 4a and 4b, the selection system may also be employed to determine whether an animal should be given access to a secondary resource such as a block of new pasture (1b). As can be seen from FIG. 5, animals can be given access to this new pasture block through the selection system (6). Animals presenting to the selection system which have either been milked previously or have a short milking interval can subsequently be allowed access to the new pasture block (1b). Conversely, if an animal from the old pasture (1a) presents to the selection station (6) and is refused accessed to the race (3), the animal's milking interval or priority status can be assessed to determine whether the animal should in turn be given access to the new pasture block (1b).

Aspects of the present invention have been described by way of example only, and it should be appreciated that modifications and additions may be made thereto without departing from the scope thereof as defined in the appended claims.

What we claim is:

1. A method for selectively controlling an access to a channel leading to a remote resource for an animal, using a processor performing the following steps:
    retrieving a specific animal record based on the output of an identification means; and
    issuing a control signal to allow an animal access to the remote resource if the retrieved animal record indicates priority animal status and an existing number of animals present in the channel is below a queue threshold value;
    employing the queue threshold value having a maximum queue threshold value used for preventing the access to the channel, and a marginal queue threshold value used for defining a range of queue length values to determine the animal access to a waiting queue,
    wherein the priority animal status is determined based on at least one of:
    a time period during which the animal is left unmilked exceeding a predetermined milking interval,
    an average milk amount produced from the animal at each milking,
    a number of visits of the animal to the waiting queue, and
    a predicted milk yield value associated with the animal due for milking.

2. The method of claim 1, further comprising executing the step of issuing a control signal if the retrieved animal record indicates that the animal associated with the record is able to use the remote resource.

3. The method of claim 2, further comprising determining whether the animal can use the remote resource by assessing at least one parameter associated with the animal.

4. The method of claim 3, wherein the at least one parameter includes at least one of an estimate of an amount of milk the animal is carrying, a health indicator associated with an animal, and a weight of the animal.

5. The method of claim 1, further comprising issuing a control signal if the retrieved animal record indicates that a return rate of the animal associated with the record is below a return rate threshold.

6. The method of claim 1, wherein the animals are dairy animals.

7. The method of claim 1, wherein the remote resource is an automatic milking system.

8. The method of claim 1, wherein the channel is one of a race and a fenced path.

9. The method of claim 1, wherein the identification means works in conjunction with an identification element connected to an animal to be identified.

10. The method of claim 9, wherein said identification element is an RFID tag.

11. The method of claim 1, further comprising querying a storage means used to store animal records.

12. The method of claim 1, further comprising manually assigning priority animal status to specific animals.

13. The method of claim 1, further comprising incrementing a return rate parameter of the identified animal's record after said animal's record has been retrieved.

14. A non-transitory computer-readable medium comprising an executable program which, when executed, instructs a computer to perform computer-executable instructions using a processor to process animal selection records stored in a data storage device for selectively controlling an access to a channel leading to a remote resource for an animal, comprising the instructions to:
    retrieve a specific animal record based on the output of an identification means; and
    issue a control signal to allow an animal access to the remote resource if the retrieved animal record indicates priority animal status and an existing number of animals present in the channel is below a queue threshold value;
    employ the queue threshold value having a maximum queue threshold value used for preventing the access to the channel, and a marginal queue threshold value used for defining a range of queue length values to determine the animal access to a waiting queue,
    wherein the priority animal status is determined based on at least one of:
    a time period during which the animal is left unmilked exceeding a predetermined milking interval,
    an average milk amount produced from the animal at each milking,
    a number of visits of the animal to the waiting queue, and
    a predicted milk yield value associated with the animal due for milking.

* * * * *